May 2, 1950     F. B. LOUCKS, JR     2,506,462
SNOW BIKE
Filed Sept. 26, 1945
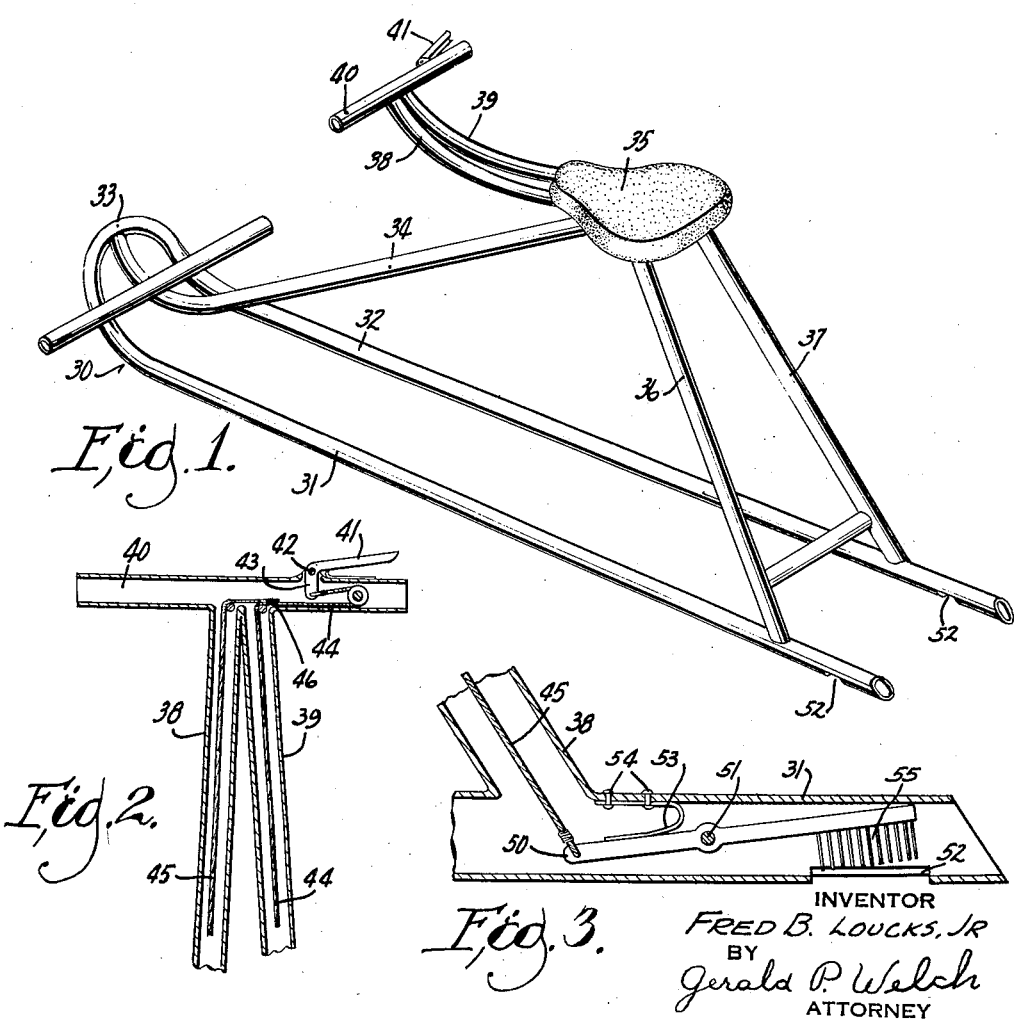
INVENTOR
FRED B. LOUCKS, JR
BY
Gerald P. Welch
ATTORNEY Patented May 2, 1950

2,506,462

UNITED STATES PATENT OFFICE 2,506,462

SNOW BIKE

Fred B. Loucks, Jr., Milwaukee, Wis.

Application September 26, 1945, Serial No. 618,614

2 Claims. (Cl. 280—12)

This invention relates to improvements in snow bikes, and more particularly to a novel single passenger sled having a bike simulating construction.

An object of the invention is to provide a device of the type which can be economically constructed of tubular metallic elements.

Another object of the invention is to fabricate a snow bike of tubular materials to utilize the relatively greater strength residing in this construction form.

Another object of the invention is to provide novel braking means in a device of the type.

Other and further objects of the invention will appear as the description proceeds, reference being had to the accompanying drawing, in which:

Fig. 1 is a view in perspective of a snow bike embodying my invention.

Fig. 2 is a detail fragmentary cross-sectional view of a portion of the braking mechanism.

Fig. 3 is a view in cross-section of another portion of the braking system.

Referring more particularly to the drawing, a runner element 30 is bent to form a pair of parallel runners 31 and 32 and the loop 33 at the forward end is raised slightly as shown. An inclined frame element 34 connects the loop 33 and the seat 35, the latter also being supported by the standards 36 and 37 having integral forward extensions 38 and 39 carrying the handle 40.

The handle 40 carries the hand lever 41 pivoted thereon at 42 and having the integral internal lever 43 secured to the brake cable 44 which latter has fixed thereto the second brake cable 45 by means of the binding 46. The cables 44 and 45 are housed in the forward extensions 38 and 39 and the standards 36 and 37 and are led rearwardly and downwardly into the runners 31 and 32. As shown in Fig. 4, the cable 45 is affixed to the brake lever element 50 pivoted at 51 in the runner 31. A wire brush is carried on element 50 and is disposed downwardly to pass through the slot at 52 in the lower side of runner 31 when pressure is applied to the hand brake lever 41. A spring 53 fastened internally of runner 31 by rivets 54 will return the brake brush 55 when hand pressure is released.

It will be understood that the device is capable of many modifications in structure and design, without departing from the spirit of the invention, within the scope of the appended claims.

What I claim and desire to secure by Letters Patent of the United States, is:

1. In a device of the character described including tubular frame elements and runners, a tubular handle member, a hand lever on the latter, a flexible cable system housed in said tubular elements and connected with said hand lever, and brake elements in said runners operable by said cable system.

2. In a device of the character described including tubular runners, wire brush braking elements pivotally mounted in said runners, the latter having slots in their lower walls for protrusion therethrough of said braking elements, and means for manually actuating the latter.

FRED B. LOUCKS, JR.

REFERENCES CITED

The following references are of record in the file of this patent:

UNITED STATES PATENTS

| Number | Name | Date |
| --- | --- | --- |
| 861,946 | Brandner | July 30, 1907 |
| 1,340,733 | Nussbaum | May 18, 1920 |
| 1,447,094 | Luhrs et al. | Feb. 27, 1923 |
| 1,954,830 | Richards | Apr. 17, 1934 |
| 2,062,953 | Wargo | Dec. 1, 1936 |
| 2,239,213 | Artmen | Apr. 22, 1941 |